US007677470B2

(12) United States Patent
Chen

(10) Patent No.: US 7,677,470 B2
(45) Date of Patent: Mar. 16, 2010

(54) SPRAYING DEVICE

(76) Inventor: Jan-Nan Chen, 8F-5, No. 142, Ta Hsiang Street, West Tun District, Taichung (TW)

( * ) Notice: Subject to any disclaimer, the term of this patent is extended or adjusted under 35 U.S.C. 154(b) by 413 days.

(21) Appl. No.: 11/778,792

(22) Filed: Jul. 17, 2007

(65) Prior Publication Data

US 2008/0054097 A1 Mar. 6, 2008

(30) Foreign Application Priority Data

Aug. 29, 2006 (TW) .............................. 95131829 A

(51) Int. Cl.
*A01G 25/14* (2006.01)
*B05B 1/00* (2006.01)

(52) U.S. Cl. ....................... 239/375; 239/346; 239/600; 239/525

(58) Field of Classification Search ................. 239/302, 239/337, 346, 525, 600, 375; 285/361, 396, 285/402
See application file for complete search history.

(56) References Cited

U.S. PATENT DOCUMENTS 4,508,272 A * 4/1985 Thompson .................. 239/318
4,804,144 A * 2/1989 Denman ..................... 239/346
6,092,740 A * 7/2000 Liu ............................ 239/346
6,820,824 B1 * 11/2004 Joseph et al. ............... 239/346
7,172,139 B2 * 2/2007 Bouic et al. ................. 239/345

OTHER PUBLICATIONS

TW 139247 (4pp.).

* cited by examiner

*Primary Examiner*—Davis Hwu
(74) *Attorney, Agent, or Firm*—Alan Kamrath; Kamrath & Associates PA

(57) ABSTRACT

A spraying device includes a gas can and a sprayer/joint combination. The gas can is formed with a collar defining a cutout. The sprayer/joint combination includes a frame, two shoes, an expanding element and a sprayer. The frame defines two slots and includes a block formed thereon and disposed in the cutout. The shoes are pivotally connected to the frame, and each of them includes a head and a tail. The expanding element includes a cam with two lobes. The expanding element can be pivoted between a locking position where the lobes push the heads of the shoes against the collar of the gas can and an unlocking position where the lobes contact the tails of the shoes. The sprayer includes a nozzle, a knob and a connective unit. The connective unit of the sprayer is connected to the expanding element through the frame.

7 Claims, 8 Drawing Sheets

SPRAYING DEVICE

BACKGROUND OF INVENTION

1. Field of Invention

The present invention relates to a spraying device and, more particularly, to a spraying device including a can and a sprayer/joint combination for easy connection to the can.

2. Related Prior Art

Disclosed in Taiwanese Patent No. 139247 is a spraying device including a gas can 30, a joint 20 and a sprayer 10 connected to the gas can 30 by the joint 20. The gas can 30 includes an annular ridge 32. The joint 20 is an annular element with an annular lower portion 23 with a reduced size. An annular flange 25 is formed on an external side of the annular lower portion 23 of the joint 20. A thread 21 is formed on an internal side of the joint 20. The sprayer 10 is made with a Y-shaped configuration, i.e., it includes three ends. The sprayer 10 includes a nozzle 14 at an end, a knob 12 at another end and a thread 15 on an external side of the remaining end. In use, the annular flange 25 is located within the annular ridge 32. The thread 15 is engaged with the thread 21, thus expanding the joint 20. Thus, the annular flange 25 tightly presses the annular ridge 32. Hence, the joint 20 keeps the sprayer 10 on the gas can 30.

Drawbacks have been encountered in the use of the conventional spraying device. Firstly, the operation is inconvenient since it requires the sprayer 10 to be rotated relative to the joint 20 for several rounds.

Secondly, the joint 20 is often lost so that the spraying device cannot be used. This is because the joint 20 is small and separated from the sprayer 10 as they are detached from the gas can 30 for avoiding leakage when the spraying device is not used.

Thirdly, it is not durable. This is because the thread 21, which is made of plastic, is worn away by the thread 15, which is made of metal, after some time of use.

The present invention is therefore intended to obviate or at least alleviate the problems encountered in prior art.

SUMMARY OF INVENTION

According to the present invention, a spraying device includes a gas can and a sprayer/joint combination. The can includes a collar thereon and a cutout in the collar. The sprayer/joint combination includes a frame, two shoes, an expanding element and a sprayer. The frame defines two slots and includes a block formed thereon and disposed in the cutout so that the frame cannot be rotated relative to the collar. The shoes are pivotally connected to the frame and each of them includes a head and a tail. The expanding element includes a cam with two lobes. The expanding element can be pivoted between a locking position and an unlocking position. In the locking position, the lobes push the heads of the shoes against the collar of the gas can. In the unlocking position, the lobes contact the tails of the shoes. The sprayer includes a nozzle, a knob and a connective unit. The connective unit of the sprayer is connected to the expanding element through the frame.

An advantage of the sprayer/joint combination according to the present invention is easy operation since it requires the sprayer to be rotated relative to the can for less than half a round.

Another advantage of the sprayer/joint combination according to the present invention is integrity since all of the elements are joined together.

Still another advantage of the sprayer/joint combination according to the present invention is durability since it does include a metal thread for engagement with a plastic metal thread that will inevitably be worn away by such a metal thread after some time of use.

Other advantages and features of the present invention will become apparent from the following description referring to the drawings.

BRIEF DESCRIPTION OF DRAWINGS

The present invention will be described through detailed illustration of the preferred embodiment referring to the drawings.

DETAILED DESCRIPTION OF PREFERRED EMBODIMENT

Figure 1:
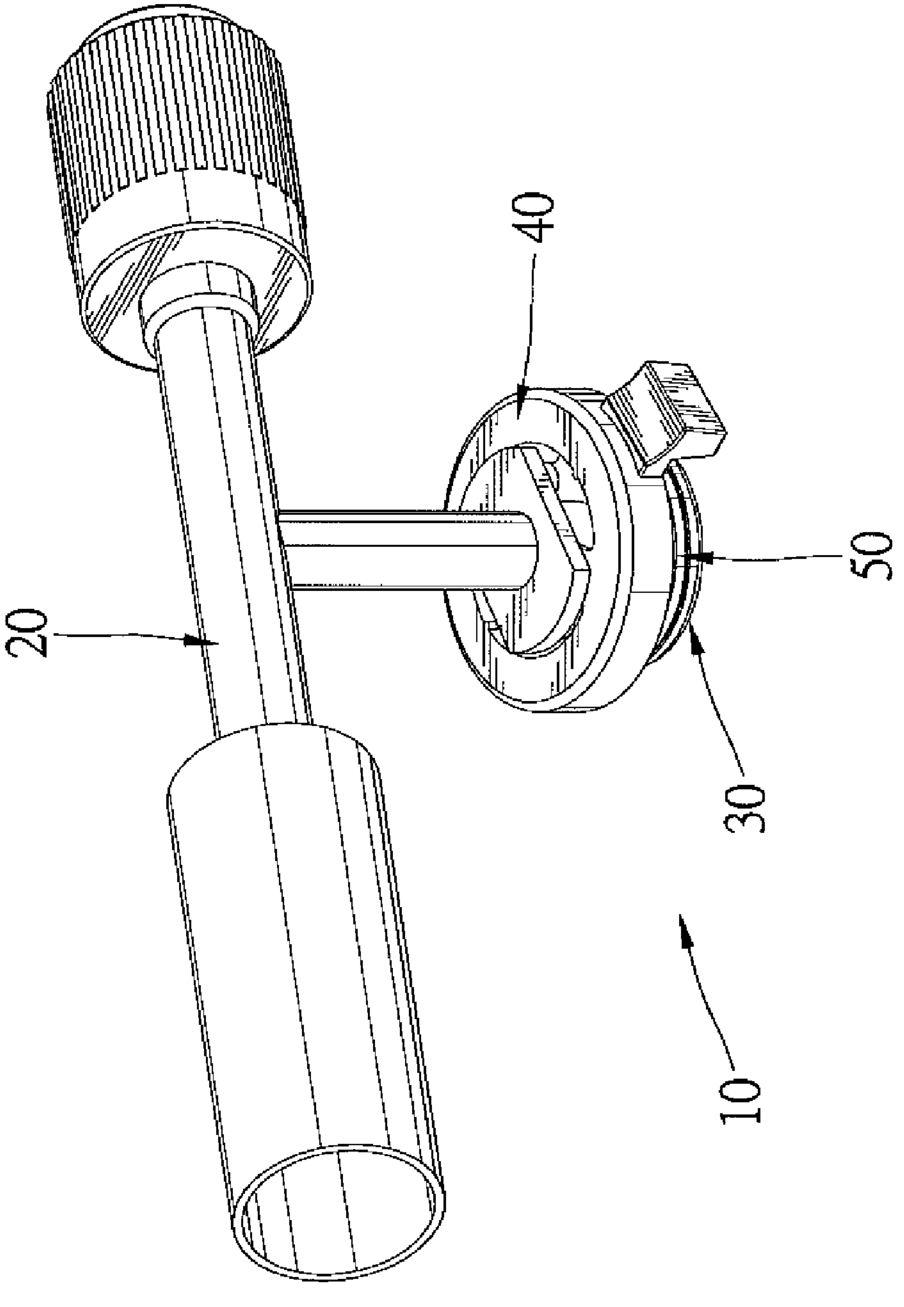
FIG. 1 is a perspective view of a sprayer/joint combination according to the preferred embodiment of the present invention.
Figure 2:
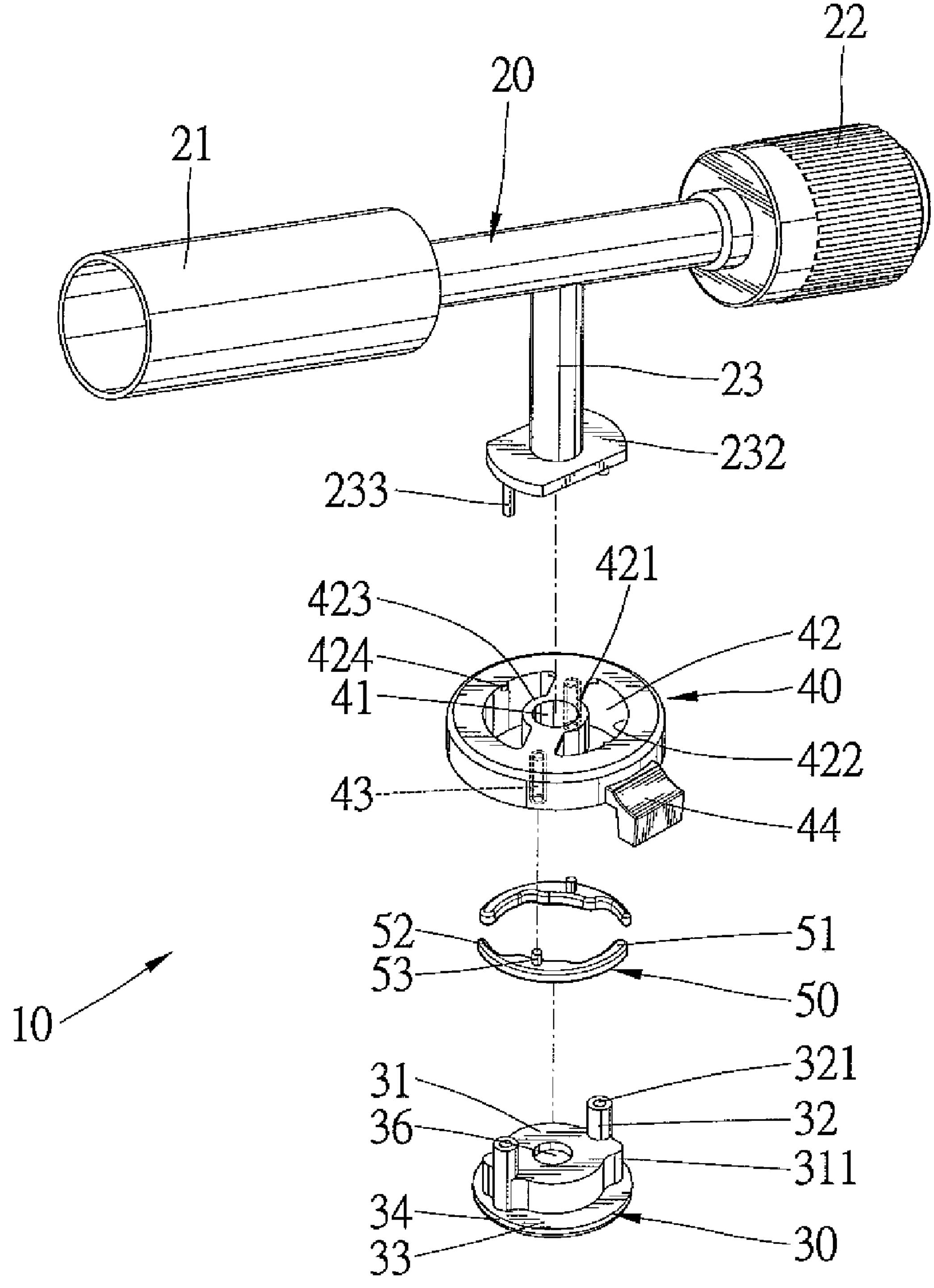
FIG. 2 is an exploded view of the combination shown in FIG. 1.

Referring to FIGS. 3 through 8, there is shown a spraying device according to the preferred embodiment of the present invention. The spraying device includes a gas can 60 and a sprayer/joint combination 10 shown in FIGS. 1 and 2.

The gas can 60 includes a top 62, a raised portion 63 formed on the top 62, a retractable nozzle 61 extended through the raised portion 63 and a collar 64 mounted on the top 62. The retractable nozzle 61 defines a passageway 611. There is a cutout 641 made in the collar 64. The collar 64 includes an internal side 65.

The sprayer/joint combination 10 includes a sprayer 20, an expanding element 30, a frame 40 and two shoes 50. The sprayer 20 is hollow. The sprayer 20 is made with a T-shaped configuration, i.e., it includes three ends. A nozzle 21 is formed at one of the ends of the sprayer 20. A knob 22 is connected to another end of the sprayer 20. A connective unit 23 is formed at the rest end of the sprayer 20. The knob 22 can be turned for regulating the rate at which gas leaves the nozzle 21. The connective unit 23 includes a passageway 231 defined therein, a plate 232 formed at a lower end and two rods 233 extended downwards from the plate 232.

The expanding element 30 includes a disc 34, a cam 31 formed on the disc 34 so that two arched spaces 33 are defined beside the cam 31 and above the disc 34, two sockets 321 formed on the cam 31 and two apertures 35 and 36 defined in the cam 31. The cam 31 includes two lobs 311. The sockets 321 each define a recess 321. The aperture 35 is larger than the aperture 36.

The frame 40 includes an aperture 41 defined therein, two arched slots 42 defined therein beside the aperture 41, two recesses 43 defined therein on a lower face and a block 44 formed on a periphery. Each of the arched slots 42 is defined by two straight walls 421, a large arched wall 422 and a small arched wall 423. Each of the straight walls 421 is connected to the large arched wall 422 at an end and connected to the small arched wall 423 at an opposite end. There is a restraint 424 formed on the large arched wall 422 of each of the arched slots 42 for limiting the movement of a related one of the rods 233.

Each of the shoes 50 includes a head 51 formed at an end, a tail 52 formed at another end and a pivot 53 formed thereon and between the ends. The size of the head 51 is larger than that of the tail 52. The shoes 50 are like those of a drum-type brake both in shape and function.

In assembly, the pivots 53 are inserted in the recesses 43 so that the shoes 50 can be pivoted relative to the frame 40. The shoes 50 are located between the frame 40 and the disc 34 and in the arched spaces 33. The sockets 32 are inserted in the arched slots 42 so that the expanding element 30 can be turned relative to the frame 40. The rods 233 are fit in the recesses 321 of the sockets 32 so that the sprayer 20, the expanding element 30, the frame 40 and the shoes 50 are joined together.

Figure 3:
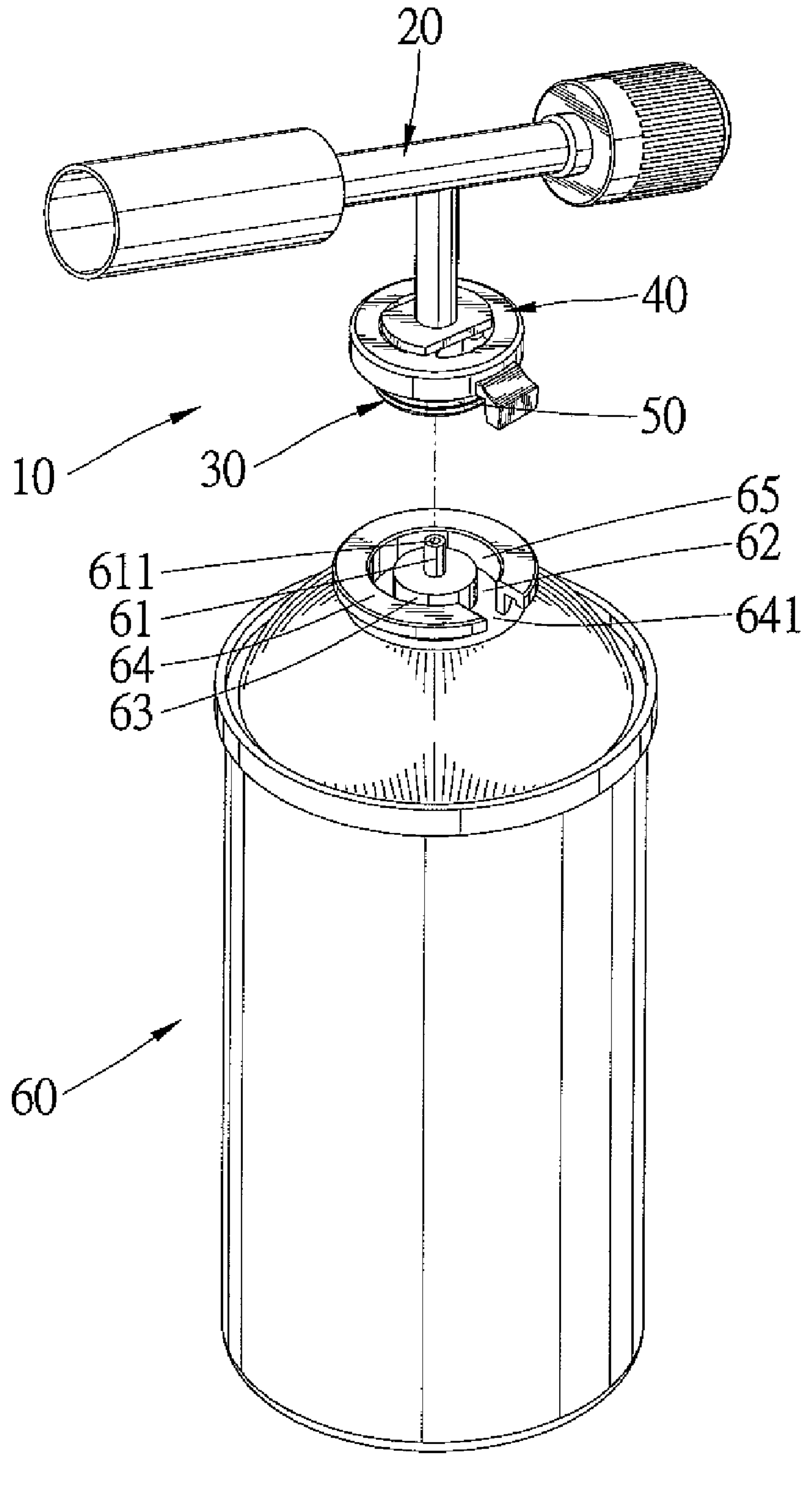
FIG. 3 is a perspective view of a spraying device includes a gas can and the combination shown in FIG. 1, showing the combination separated from the gas can.
Figure 4:
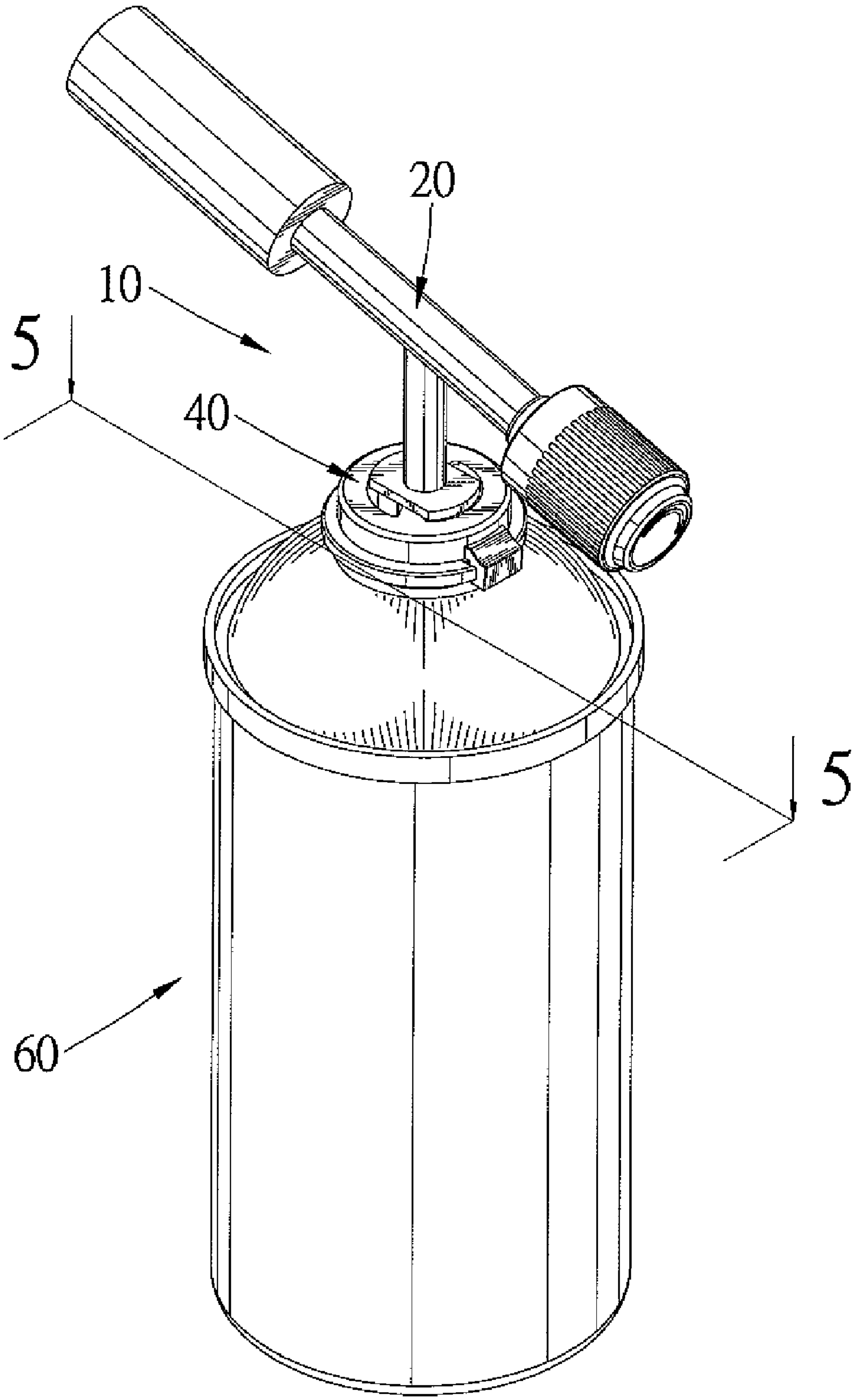
FIG. 4 is a perspective view of the spraying device in another position than shown in FIG. 3, showing the combination attached to the gas can.

Referring to FIGS. 3 and 4, in use, the expanding element 30 and the shoes 50 are located within the collar 64. The frame 40 is mounted on the collar 64. The block 44 is located in the cutout 641 so that the frame 40 cannot be rotated on the gas can 60. The raised portion 63 of the gas can 60 is disposed in the aperture 35. The retractable nozzle 61 is inserted through the aperture 36.

Figure 8:
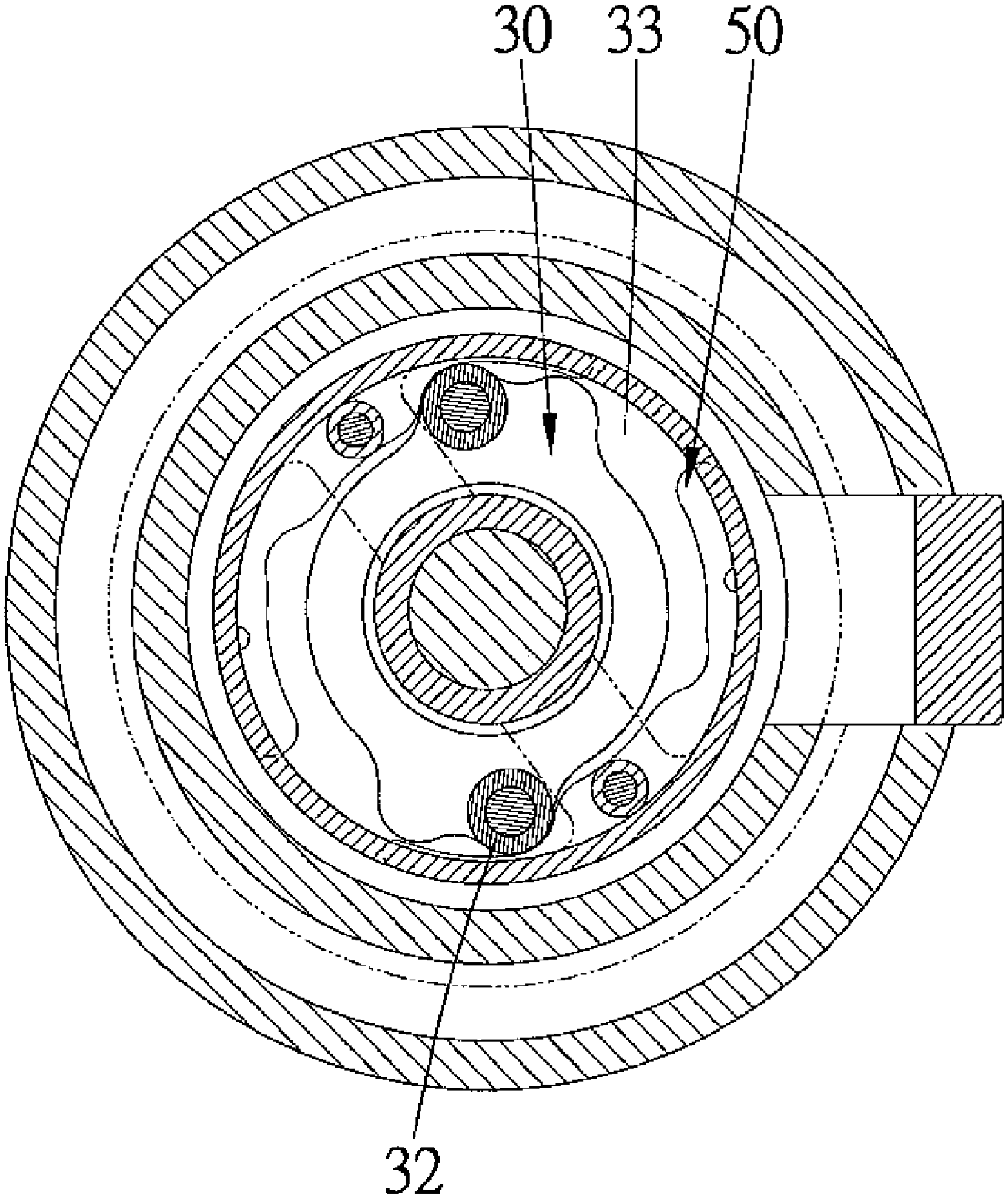
FIG. 8 is a cross-sectional view of the spraying device in another position than shown in FIG. 5.

Referring to FIG. 8, there is shown an unlocking position of the sprayer/joint combination. In the unlocking position, the lobes 311 of the cam 31 are located against the tails 52 of the shoes 50 so that the shoes 50 are not located against the internal side 65 of the collar 64 of the gas can 60.

Figure 5:
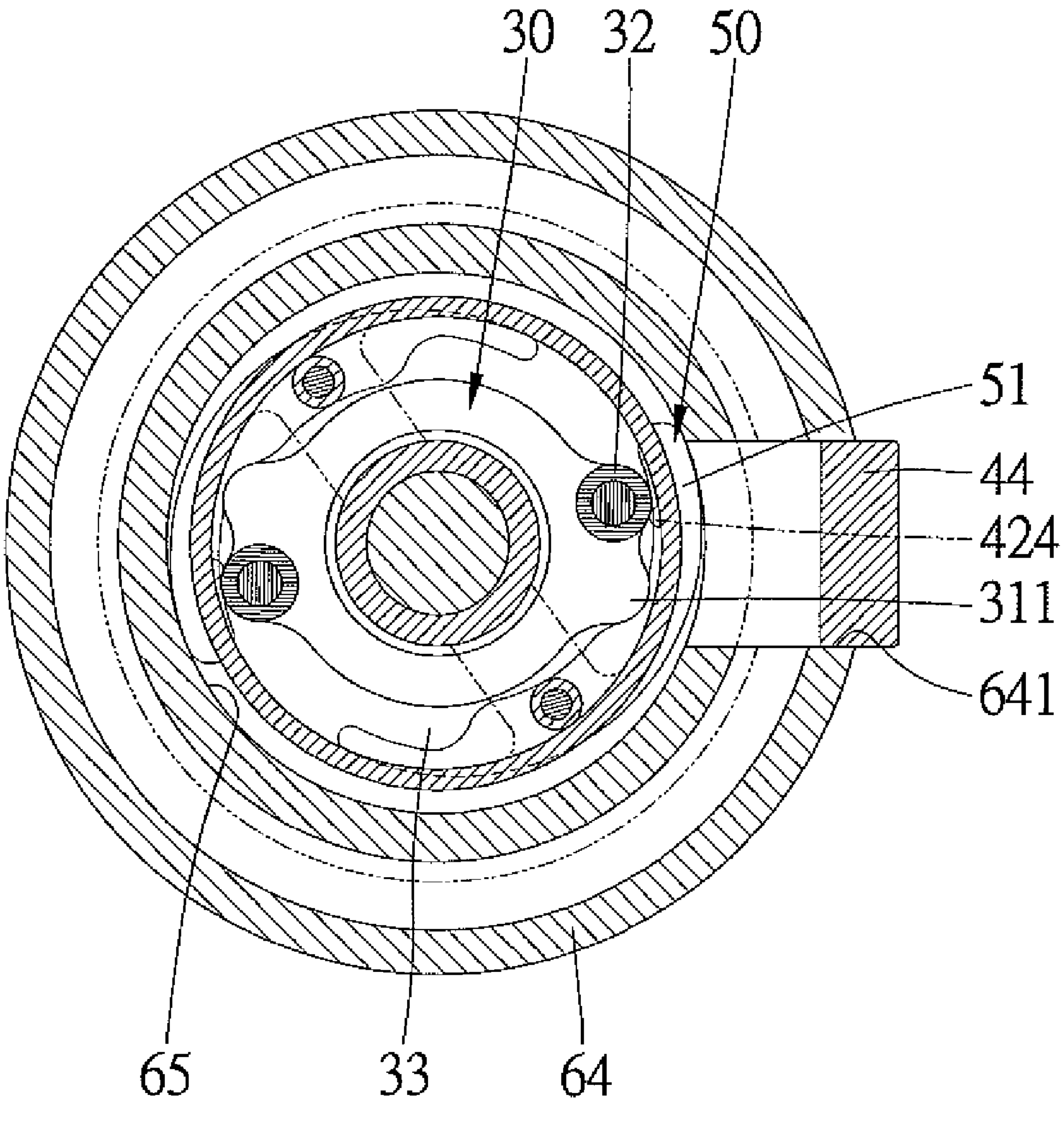
FIG. 5 is a cross-sectional view of the spraying device taken along a line 5-5 shown in FIG. 4.
Figure 6:
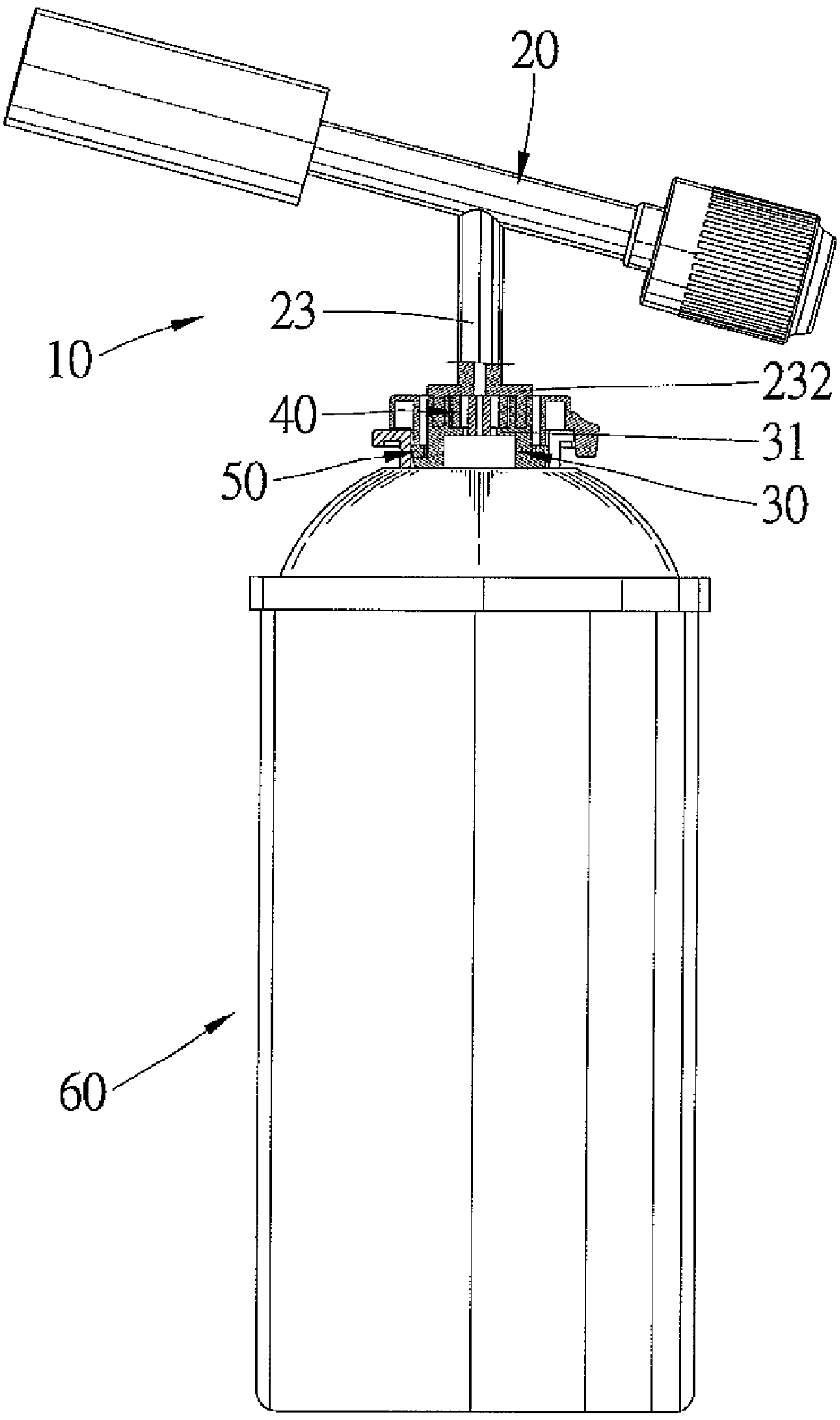
FIG. 6 is another cross-sectional view of the spraying device shown in FIG. 5.
Figure 7:
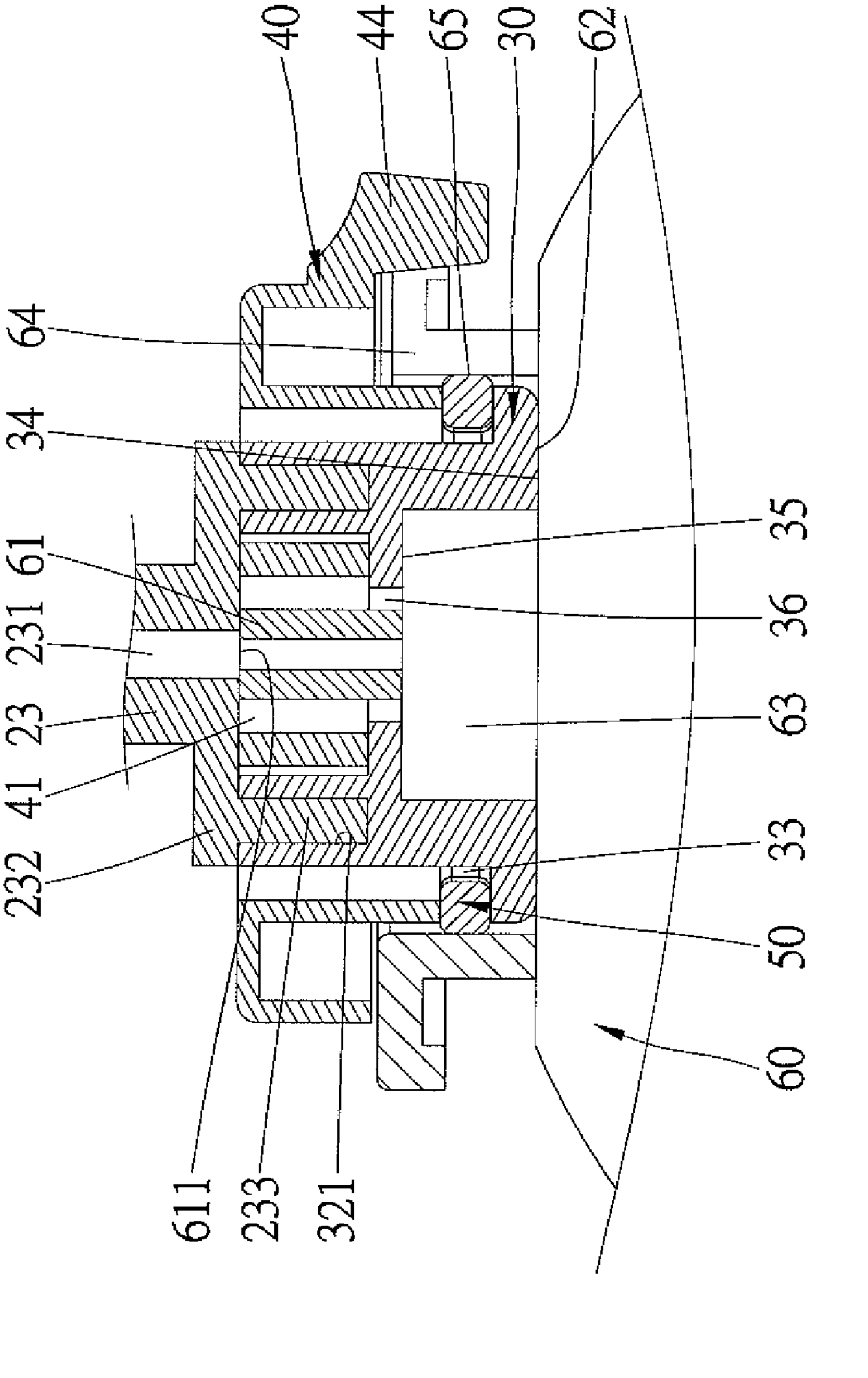
FIG. 7 is an enlarged cross-sectional view of the spraying device shown in FIG. 6.

Referring to FIGS. 5 through 7, there is shown a locking position of the sprayer/joint combination. By turning the sprayer 20, the cam 31 can be pivoted from the unlocking position to the locking position. In the locking position, the lobes 311 of the cam 30 are located against the heads 51 of the shoes 50 so that the heads 51 of the shoes 50 are located against the internal side 65 of the collar 64 of the gas can 60. Thus, the sprayer 20, the expanding element 30, the frame 40 and the shoes 50 are retained on the gas can 60.

The sprayer/joint combination according to the present invention exhibits several advantages. Firstly, the operation is easy since it requires the sprayer 20 to be rotated relative to the gas can 60 for less than half a round.

Secondly, no element will be missing as all of the elements are joined together.

Thirdly, it is durable without using a metal thread for engagement with a plastic metal thread that will inevitably be worn away by such a metal thread after some time of use.

The present invention has been described through the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A spraying device comprising:

a gas can comprising a collar mounted thereon and a cutout defined in the collar; and a sprayer/joint combination comprising:

a frame comprising two slots defined therein and a block formed thereon and disposed in the cutout so that the frame cannot be rotated relative to the collar;

two shoes pivotally connected to the frame, wherein each of the shoes comprises a head and a tail;

an expanding element comprising a cam formed with two lobes, wherein the expanding element can be pivoted between a locking position where the lobes push the heads of the shoes against the collar of the gas can and an unlocking position where the lobes contact the tails of the shoes; and a sprayer comprising a nozzle thereon, a knob thereon and a connective unit thereon, wherein the connective unit is connected to the expanding element through the frame.

2. The spraying device according to claim 1 wherein the gas can comprises a nozzle, and the frame defines an aperture through which the nozzle is inserted, and the expanding element defines an aperture through which the nozzle is inserted.

3. The spraying device according to claim 1 wherein the frame defines two apertures, and each of the shoes comprises a pivot inserted in a related one of the apertures.

4. The spraying device according to claim 1 wherein the expanding element comprises two sockets formed on the cam, and the connective unit of the sprayer comprises two rods fit in the sockets.

5. The spraying device according to claim 4 wherein the connective unit of the sprayer comprises a plate from which the rods are extended.

6. The spraying device according to claim 4 wherein the frame comprises a restraint formed on a wall of each of the slots for restraining a related one of the sockets.

7. The spraying device according to claim 1 wherein the expanding element comprises a disc for supporting the shoes.

* * * * *